US009078286B1

(12) United States Patent
Yuan et al.

(10) Patent No.: US 9,078,286 B1
(45) Date of Patent: Jul. 7, 2015

(54) MESH BASE TRANSCEIVER STATION NETWORK OPTIMIZED FOR BACKHAUL ACCESS

(75) Inventors: Wenhui Yuan, Ottawa (CA); Randy Kuang, Kanata (CA); Qingchao Liu, Kanata (CA)

(73) Assignee: Apple Inc., Cupertino, CA (US)

( * ) Notice: Subject to any disclaimer, the term of this patent is extended or adjusted under 35 U.S.C. 154(b) by 2444 days.

(21) Appl. No.: 11/618,070

(22) Filed: Dec. 29, 2006

Related U.S. Application Data

(60) Provisional application No. 60/775,688, filed on Feb. 22, 2006, provisional application No. 60/775,611, filed on Feb. 22, 2006.

(51) Int. Cl.
*H04W 88/08* (2009.01)
*H04L 12/701* (2013.01)

(52) U.S. Cl.
CPC ............ *H04W 88/085* (2013.01); *H04L 45/00* (2013.01)

(58) Field of Classification Search
CPC . H04L 63/104; H04L 29/12254; H04L 41/04; H04L 41/046; H04L 41/0803; H04L 45/02; H04L 45/20; H04L 5/0012; H04L 61/2069; H04L 63/18; H04L 12/28; H04W 84/12; H04W 8/245; H04W 28/08; H04W 88/08; H04W 88/085; H04W 16/24; H04W 16/12; H04B 7/0413; H04B 7/18584; H04N 21/43632; G06N 3/04; G08B 21/0277
USPC .......................... 455/447, 41.2; 370/406, 328
See application file for complete search history.

(56) References Cited

U.S. PATENT DOCUMENTS

| | | | | |
|---|---|---|---|---|
| 6,963,747 | B1* | 11/2005 | Elliott | 455/450 |
| 2005/0070289 | A1* | 3/2005 | Vestama et al. | 455/442 |
| 2005/0074019 | A1* | 4/2005 | Handforth et al. | 370/406 |
| 2006/0083186 | A1* | 4/2006 | Handforth et al. | 370/310 |
| 2006/0099954 | A1* | 5/2006 | Henderson et al. | 455/447 |

\* cited by examiner

*Primary Examiner* — Nizar Sivji
(74) *Attorney, Agent, or Firm* — Meyertons, Hood, Kivlin, Kowert & Goetzel, P.C.

(57) ABSTRACT

A mesh base transceiver station capable of being configured to provide an optimized backhaul network for a mesh data network deployment. For each mesh base transceiver station in the network, a primary backhaul data path is configured with a wired base transceiver station associated with the network, wherein the primary backhaul data path is a single-hop data path. Upon configuration, the mesh base transceiver station is communicatively coupled with the wired base transceiver station via the primary backhaul data path.

14 Claims, 7 Drawing Sheets optimized backhaul network 100

MESH BASE TRANSCEIVER STATION NETWORK OPTIMIZED FOR BACKHAUL ACCESS

CROSS-REFERENCE TO RELATED APPLICATIONS

The present application claims priority pursuant to 35 USC §119(e) to U.S. Provisional Application Ser. No. 60/775,688, entitled "Optimized Mesh WiMAX Base Station Network with Star Topology Zones," filed Feb. 22, 2006, and to U.S. Provisional Application Ser. No. 60/775,611, entitled "WiMAX Base Station (BTS) Data Path Architecture," filed Feb. 22, 2006, each of which is hereby incorporated by reference herein in its entirety.

BACKGROUND

1. Technical Field

The present invention relates generally to wireless data networks, and more particularly to backhaul access service to wireless data networks.

2. Related Art

Wireless data networks have provided mobile connectivity for subscribers under fixed wireless and/or mobile wireless modes. Generally, the evolution of fixed wireless access has given rise to mesh data networks (such as those provided under IEEE §802.16 specifications) that may provide "last mile" connectivity to households and/or businesses providing broadband data rates. In regions without pre-existing physical cable or telephone networks, such technology may provide a viable alternative for broadband voice and data access. Further, mesh data networks have evolved to incorporate mobile wireless access support to subscribers.

For large-scale deployment, mesh networks require deployment of hundreds to thousands of mesh base transceiver stations, with each base transceiver station requiring backhaul wire and/or optic fiber cable access to Internet networks and/or backbones. As a result, large numbers of cables have been needed for the backhaul access, incurring large deployment costs in time, material, and labor. Further, such deployments incur data transmission delays to accessing the backhaul networks, undercutting the advantages that otherwise may have been realized by the bandwidth available by the mesh data network technology.

Thus, a need exits to increase the efficiency in the cost of deploying mesh base transceiver stations with sufficient backhaul access, and to further refine the efficiency in the data transmission from a mesh base transceiver station to a backhaul access node to take advantage of the bandwidth of the mesh data network technology.

SUMMARY

Provided is a base transceiver station and methods to optimize backhaul for a mesh data network deployment. The network can include a plurality of mesh base transceiver stations and a wired base transceiver station that can be communicatively coupled to an access service networks gateway via at least one data network. The method includes, for each mesh base transceiver station of the plurality of mesh base transceiver station, configuring a primary backhaul data path with the wired base transceiver station, wherein the primary backhaul data path is a single-hop data path. Upon configuration, the mesh base transceiver station is communicatively coupled with the wired base transceiver station via the primary backhaul data path.

As an aspect of configuring the primary backhaul data path, the mesh base transceiver station synchronizes with the wired base transceiver station over a wireless channel, and determines whether the mesh base transceiver station is assigned to the wired base transceiver station. When the mesh base transceiver station is assigned to the wired base transceiver station, the mesh base transceiver station retrieves and stores parameter information regarding the wired base transceiver station. With the information, the mesh base transceiver station establishes, via the wireless channel, an over-the-air transport connection with the wired base transceiver station based upon the parameter information of the wired base transceiver station.

As a further aspect, the mesh base transceiver station configures a secondary backhaul data path with a nearest neighbor mesh base transceiver station. The secondary backhaul data path causes the mesh base transceiver station to access the second wired base transceiver station within two hops. Upon configuration, the mesh base transceiver station communicatively couples with the nearest neighbor mesh base transceiver station.

In a further aspect of configuring the secondary backhaul data path, the mesh base transceiver station synchronizes with the nearest neighbor mesh base transceiver station via the wireless channel, and determines whether the mesh base transceiver station is assigned to the wired base transceiver station. When the mesh base transceiver station is assigned to the nearest neighbor mesh base transceiver station, the mesh base transceiver station retrieves and stores parameter information regarding the nearest neighbor mesh base transceiver station. With the parameter information, the mesh base transceiver station establishes, via the wireless channel, an over-the-air transport connection with the nearest neighbor mesh base transceiver station based upon the parameter information of the wired base transceiver station.

Other aspects and features of the present invention will become apparent to those ordinarily skilled in the art upon review of the following description of specific embodiments of the invention in conjunction with the accompanying figures.

DETAILED DESCRIPTION OF THE DRAWINGS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents. It is further understood that as used herein, terms such as "coupled", "connected", "electrically connected", "in signal communication", "communicatively coupled" and the like may include direct connections between components, indirect connections between components, or both, as would be apparent in the overall context of a particular embodiment. The term "coupled" is intended to include, but not be limited to, a direct electrical connection. The terms transmit, transmitted, or transmitting is intended to include, but not be limited to, the electrical transmission of a signal from one device to another.

Figure 1:
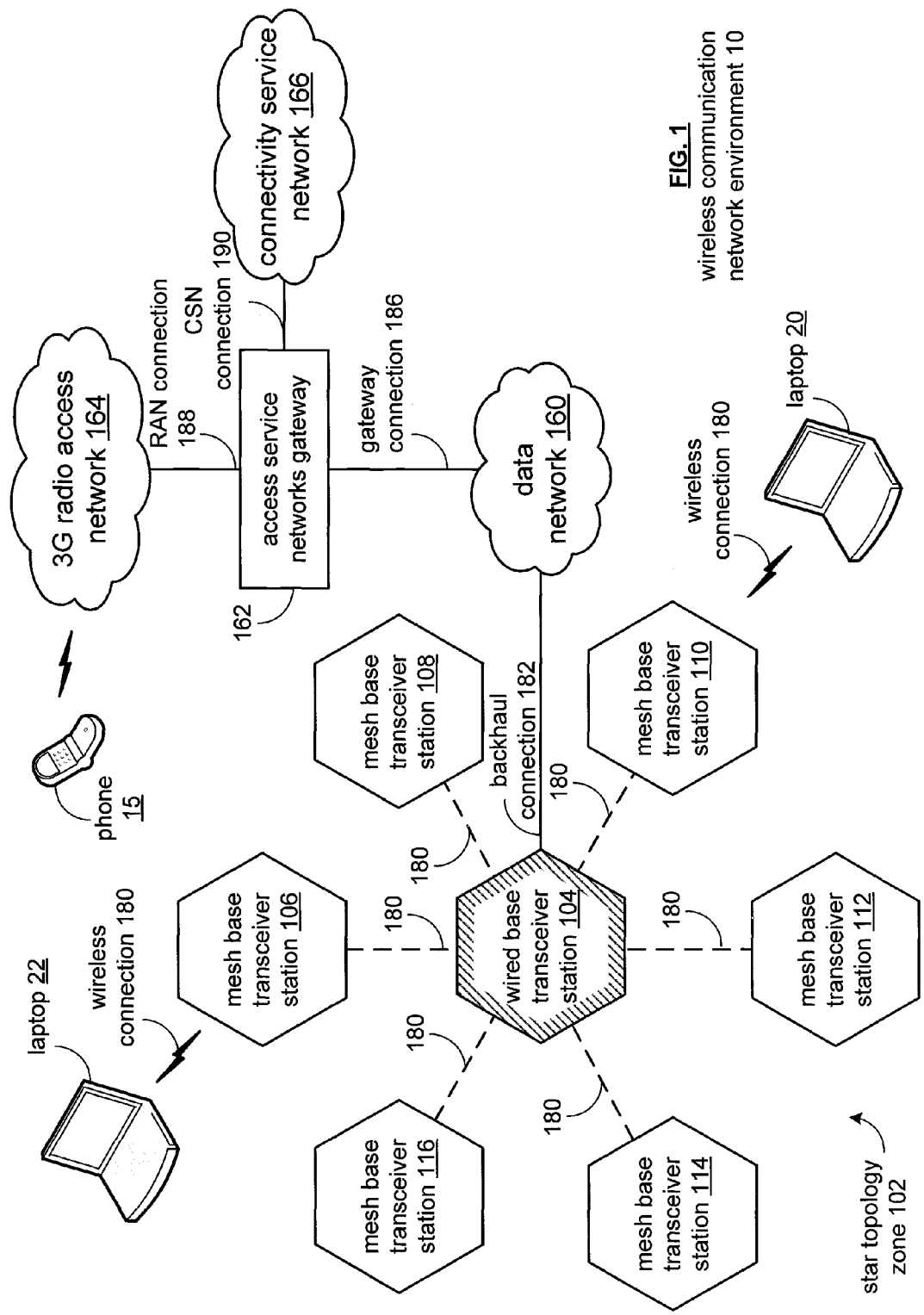
FIG. 1 is a functional block diagram illustrating a wireless communication network environment that includes circuit devices and network elements and the operation thereof according to an embodiment of the invention.

FIG. 1 is a functional block diagram illustrating a wireless communication network environment 10 that includes circuit devices and network elements and the operation thereof according to an embodiment of the invention. More specifically, a star topology zone 102 is a part of the network environment 10, which can include, by way of example, one or more of a data network 160, an access service networks gateway 162, a connectivity service network 166, and a 3G radio access network 164.

A plurality of wireless communication devices are illustrated as coupled to the wireless communication network environment 10. The wireless communication devices 20, 22 and 15, may be in the form of laptop computers 22 and 20, cellular (or Internet-capable) telephones 15, and other wireless communication devices, such as personal digital assistants, personal computers, et cetera. The details of the wireless communication network environment 10 will be described in greater detail with reference to FIGS. 2 through 7.

The star topology zone 102 includes a plurality of mesh base transceiver stations 106-116, which are coupled to each other via fixed wireless connections 180, indicated by dashed lines between the base transceiver stations. Each of the mesh base transceiver stations 106-116 are in communication with the wired base transceiver station 104 through fixed wireless connections 181. The wired base transceiver station 104 provides a backhaul connection 182 to the mesh base transceiver stations 106-116 for access to the data network 160.

In general, in a wirelessly-deployed mesh network, each of the base transceiver stations require a backhaul connection to the data network 160 (such as an Internet backbone and/or a T1/E1 backhaul as well). In the star topology zone 102, a physical backhaul connection 182 is replaced by a fixed wireless connection optimized to minimize the number of hops to access the data network. In this manner, the cost and inefficiency of providing a physical backhaul connection 182 (such as through cables, fiber optics, et cetera) is minimized. The data network 160 may be provided as an Internet protocol network or other form of packet data network capable of facilitating data communication between the wired base transceiver station 104 and the data network 160.

The fixed wireless connections 180 and 181 may be provided under industry standards specification, such as an IEEE §802.16d, which provides up to seventy-five megabits per second bandwidth and up to a 50-kilometer range. The radio frequency band under this specification is within 2.6 GHz and 5.8 GHz. The teachings of the invention disclosed herein, however, are not limited to this stated frequency range. Also, various signal modulation techniques may be used in the wireless channel, such as QPSK (Quadrature Phase Shift Keying), BPSK (Binary Phase Shift Keying), 16 QAM, 64 QAM, et cetera. Mobile wireless connections 184 are provided under the mobility extension to the IEEE §802.16d specification (that is, the IEEE §802.16e specification). Accordingly, the mobile wireless connections 184 provide the device and/or the users to transfer in and out of cell coverage provided by each of the mesh base transceiver stations 106-116.

The data network 160 is coupled to the access service networks gateway 162 via a gateway connection 186. The access service networks gateway 162 is a subscriber access gateway that facilitates communications with the star topology zone 102 and that also concentrates subscriber traffic from peer-based transceiver stations 104-116. The primary responsibilities of the access service networks gateway 162 is to provide mobility services to mobile IP-firmware and simple Internet protocol user access devices and processing of subscriber-controlled bearer traffic. The access service networks gateway 162 couples to a wireless access network, such as a 3G radio access network 164, via radio access network ("RAN") connection 188.

The 3G radio access network may be provided under wireless transmission standards, including, for example, 1×EV-DO (Evolution Data Only, Evolution Data Optimized), W-CDMA (Wideband Code Division Multiple Access), UMTS (Universal Mobile Telecommunications System), LTE (Long Term Evolution), SAE (System Architecture Evolution), et cetera. In general, 3G refers to next generation wireless technologies extended beyond personal communication services. Further iterations of such networks are anticipated, for example 4G, which serves as a successor of 3G and further includes data transmissions supporting multimedia messaging, mobile TV, high definition TV content, DVB and minimal services, such as voice and data at any time and any place. 4G may also be referred to as 3G and beyond.

The access service networks gateway 162 is also coupled to a connectivity service network via Connectivity Service Network ("CSN") connection 190 which may access the connectivity service network 166 via a home agent based network. Connectivity service network 166 provides service features, such as services authorization, IP host configuration management, and tunneling between the wireless communication device and the connectivity service network 166.

Further provided, via the connection 190, from the connectivity service network 166 is mobility management for the wireless communication device between base transceiver stations. In general, the connectivity service network 166, via the star topology zone 102, provides subscribers with such services as dynamic host configuration protocol ("DHCP") server, often occasion, authorization and accounting ("AAA"), file transfer protocol ("FTP"), inter-operator and inter-technology roaming and other such services. The star topology zone 102 may be organized and structured through operations, administration and maintenance ("OA&M") functionality to facilitate the entry and removal of its constituent mesh base transceiver stations.

Figure 2:
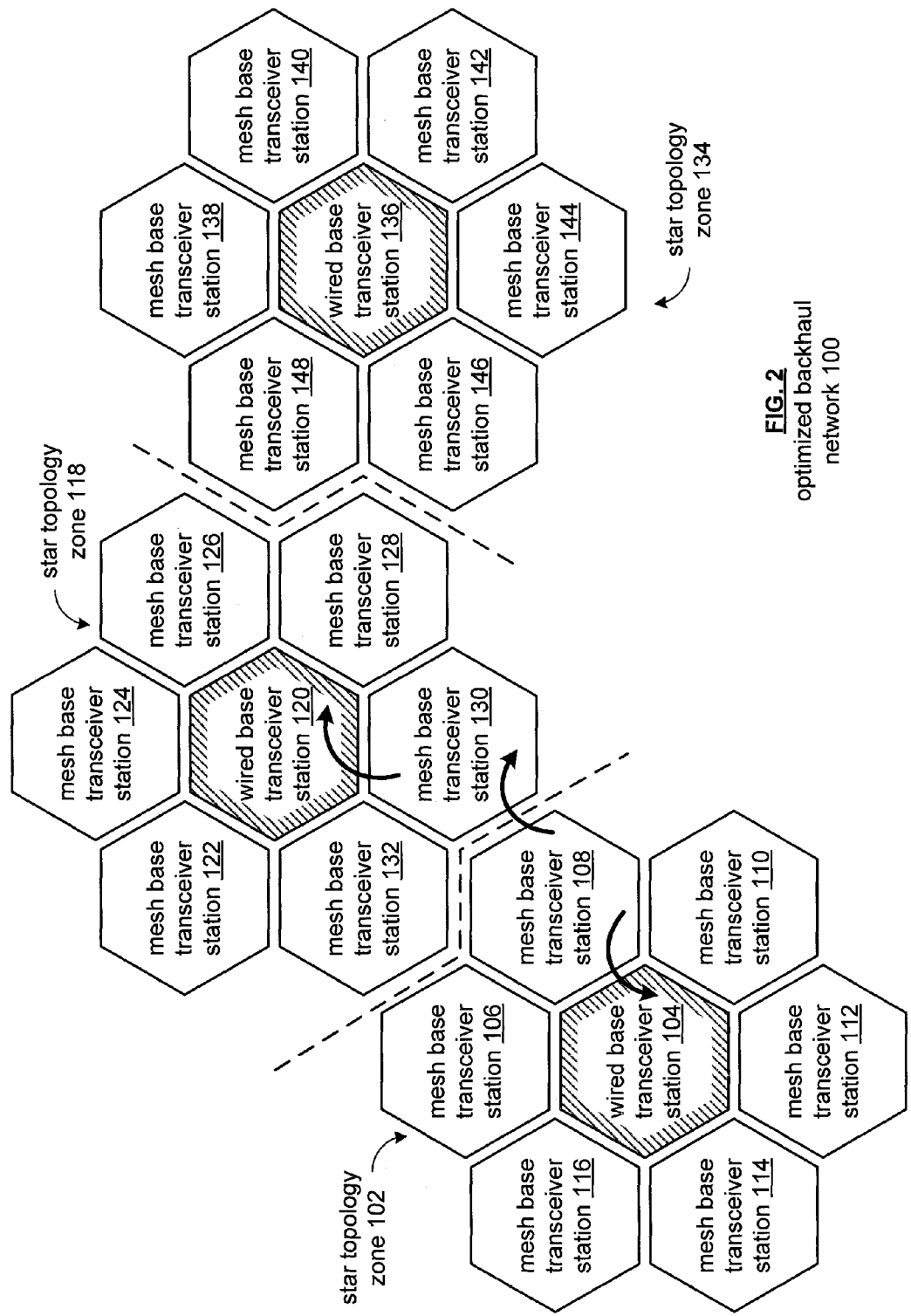
FIG. 2 is a block diagram of an optimized backhaul network according to an embodiment of the present invention.

FIG. 2 is a block diagram of an optimized backhaul network 100. The optimized backhaul network 100 includes a star topology zone 102, a star topology zone 118 and a star topology zone 134.

The star topology zone 102 includes mesh base transceiver stations 106-116 that are coupled via a fixed wireless connection to the wired base transceiver station 104. Star topology zone 118 includes mesh base transceiver stations 122-132 that are coupled to the wired based transceiver station 120 through a fixed wireless connection. Star topology zone 134 includes mesh base transceiver stations 138-148 that are coupled to the wired base transceiver station 136 through a fixed wireless connection.

The optimized backhaul network 100 illustrates the reduction of backhaul connections coupling the base transceiver stations to an access service networks gateway 162 via a respective wired base transceiver station (such as wired base transceiver stations 104, 120, and 136). The reduction of backhaul connections is realized by a single wired base transceiver station per zone, and the arrangement of the zone to allow only one hop from a mesh base transceiver station to a wired base transceiver station.

By example, mesh base transceiver station 108 has a "one hop" distance to the wired base transceiver station 104. Minimizing the number of hops to access a backhaul connection of the wired base transceiver station increases the efficiency of the network 100 and reduces complexity.

Further, redundancy topologies can be implemented that take advantage of the optimized structure of the star topology zones 102, 118, and 134. In the event that the wired base transceiver station 104 fails or becomes inoperable, the optimized backhaul network provides a secondary backhaul data path with "two hops" to a nearest neighbor wired based transceiver station.

For example, the mesh base transceiver station 108 is associated with a nearest neighbor mesh base transceiver station 130, which has one hop access to the wired base transceiver station 120. The star topology zone 118 provides system redundancy to the star topology zone 102 (and to the star topology zone 134) with secondary data path access in the event of a wired backhaul connection failure. In this example, the mesh base transceiver station 108 has a two-hop access to the wired base transceiver station 120 if the wired base transceiver station 104 becomes unavailable. The hop optimization is provided through nearest neighbor mesh base transceiver stations. The nearest neighbor mesh base transceiver stations to the mesh base transceiver station 108 are mesh base transceiver stations 132 and 130 of star topology zone 118.

In this manner, the data path for each of the mesh base transceiver stations is optimally selected and contains only "one hop" to the access service networks gateway under normal operational conditions, and if the wired base transceiver station fails, then the "two hops" secondary backhaul data path is available providing traffic routing to a nearest neighbor in an adjacent star topology zone.

Figure 3:
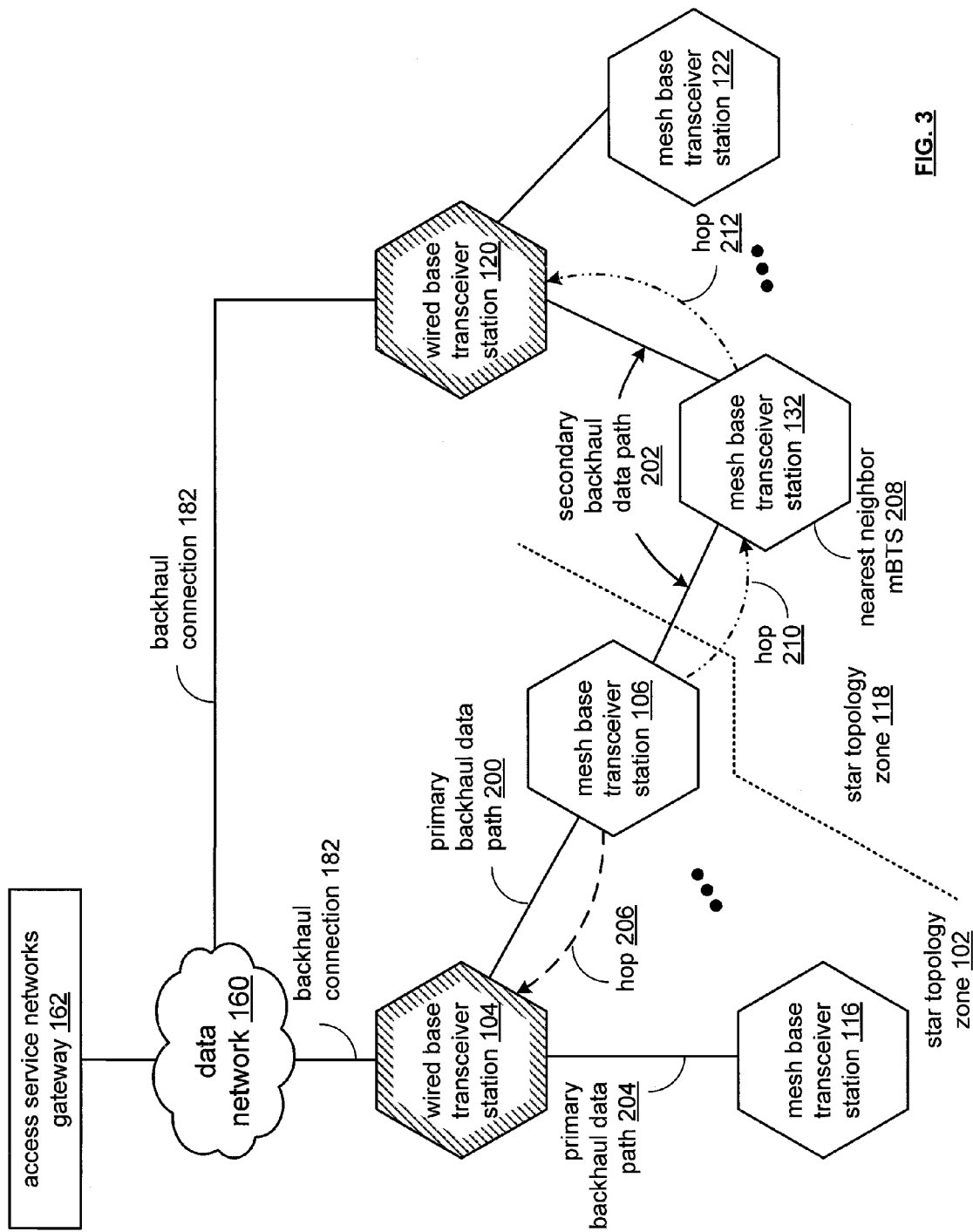
FIG. 3 is a detail block diagram illustrating primary and secondary backhaul data paths within a wireless communication network environment according to an embodiment of the present invention.

FIG. 3 is a detail block diagram illustrating primary and secondary backhaul data paths within a wireless communication network environment 10. For the present example, the star topology zone 102 and the star topology zone 118 are used.

The mesh base transceiver stations 106 and 116 establish primary backhaul data paths 200 and secondary backhaul data path 202 establishes a fixed wireless network oriented about a respective wired base transceiver station. In this instance, the mesh base transceivers 106-116 are oriented around wired base transceiver station 104 to form star topology zone 102. In the instance of the star topology zone 118, the fixed wireless network is established with the mesh base transceiver stations 122-132 oriented about, or anchored by, the wired base transceiver station 120.

The wired base transceiver station 104 is coupled to the data network 160 via the backhaul connection 182, as well as the wired base transceiver station 120 coupled to the backhaul connection 182. With respect to mesh base transceiver station 106 as an example, a hop 206 provides access to the wired base transceiver station 104. No further hops are required for the routing to gain access to the backhaul connection that provides access to the access service networks gateway 162.

A hop is an intermediate connection in a string of connections linking two network devices, such as a subscriber's wireless communication device with a secondary (or destination) wireless communication device (such as laptop 22), as well as to other devices coupled to the network via the access service networks gateway 162 (such as the phone 15). In general, most data packets are routed through several routers before reaching a final destination. Each time the packet is forwarded to the next router, a hop occurs.

The more hops in a data path, the longer amount of time passes for data to go from the source to the destination. In effect, the more air hops in a data path, the greater complexity results in configuring and supporting data paths in the mesh network, greater complexity in network management (that translates into greater maintenance resources and expense), and adversely impacts network throughput performance. The present mesh backhaul network, provided by the star topology zone, implements single hops to the wired base transceiver station 104, and to the backhaul connections 182. Accordingly, the length of time for routing data to a destination is reduced through a primary backhaul data path 200, or through other paths such as the primary backhaul data path 204. In this manner, the complexity of the mesh backhaul network and maintenance overhead is reduced, and the data throughput realized by a subscriber or mobile station is improved.

In a further aspect, the mesh base transceiver station 106 establishes a secondary backhaul data path 202 with a nearest neighbor mesh base transceiver station of an adjacent start topology zone. A mesh base transceiver station uses a secondary backhaul data path upon the failure, inoperability, or inaccessibility to a wired base transceiver station 104 of its primary backhaul data path 200. In this manner, redundancy is provided within the network such that data traffic may still be routed although not with the optimum efficiency of the primary backhaul data path (that is, two hops for the secondary backhaul data path, instead of a single hop for a primary backhaul data path).

To establish a secondary backhaul data path, the mesh base transceiver station 106 configures a data path with a nearest neighbor mesh base transceiver station 208, such as the mesh base transceiver station 132. The nearest neighbor to a mesh base transceiver station may be assessed through network protocols, such as OSPF (Open Shortest Path First) that incorporates least-cost, equal-cost, and load balancing algorithms, or through programmed geographical locations so that a mesh base transceiver station may determine the nearest neighbor mesh base transceiver station, through the operations, administration and maintenance ("OA&M") network functions, et cetera.

The mesh base transceiver station 132, being communicatively coupled with the wired base transceiver station 104, provides the secondary backhaul data path 202, which can then be used by the mesh base transceiver station 106 within two hops, which includes hop 210 and hop 212. The methodology and process relating to establishing the primary and secondary backhaul data paths will be discussed in detail with respect to FIGS. 4-7.

Figure 4:
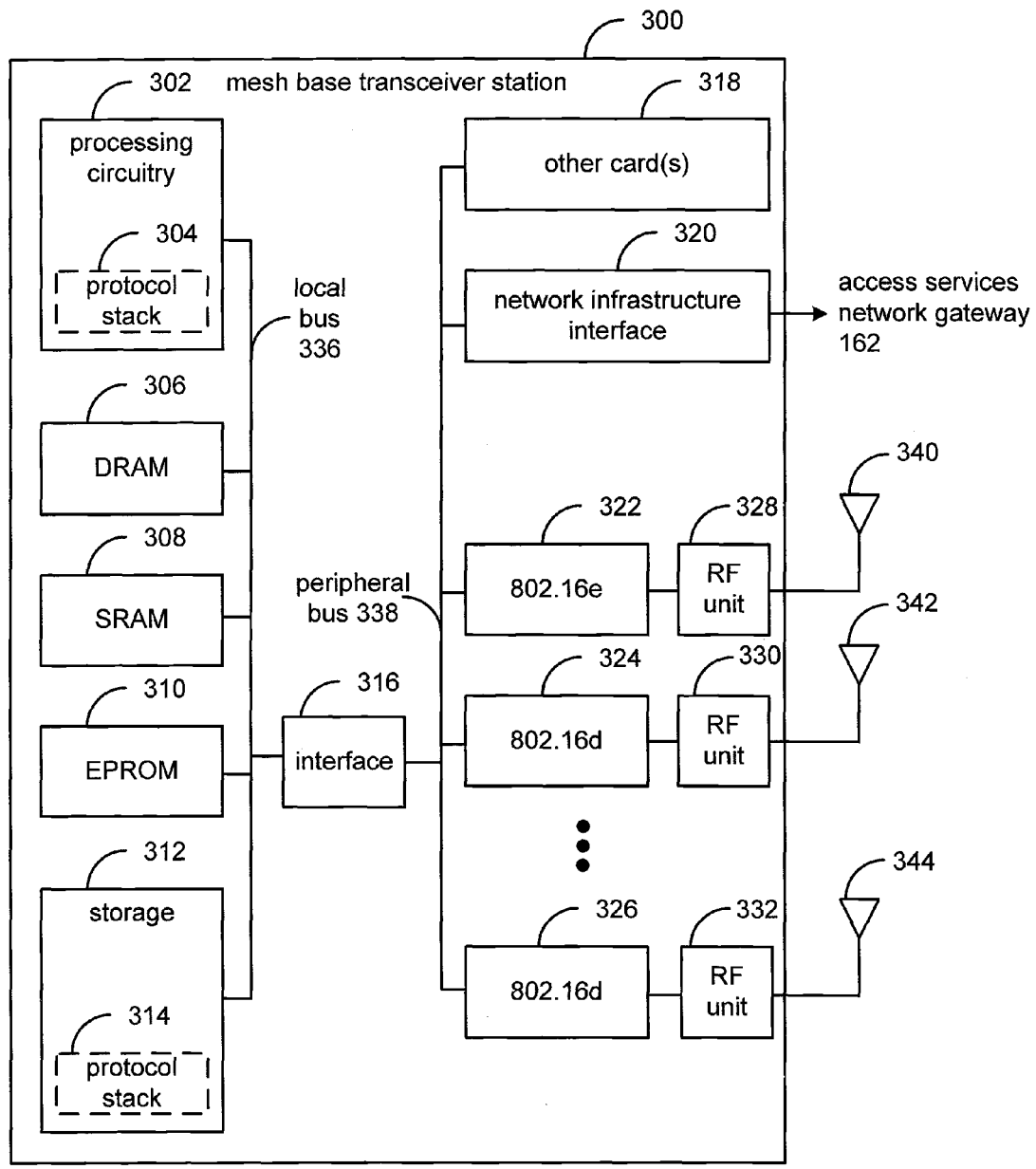
FIG. 4 is a block diagram illustrating a mesh base transceiver station constructed according to an embodiment of the invention.

FIG. 4 is a block diagram illustrating a mesh base transceiver station 300 constructed according to an embodiment of the invention. The base station 300 supports a plurality of heterogeneous physical layer modes (for example, IS-95A, IS-95B, IS-2000, GSM-EDGE and/or various 3G and 4G standards specifications that are compatible with the teachings herein). The base station 300 supports protocol layer operations such as those described with reference to FIGS. 2 through 7.

The base station 300 includes a processor 302, dynamic RAM 306, static RAM 308, EPROM 310, and at least one data storage device 312, such as a hard drive, optical drive, tape drive, et cetera. These components (which may be contained on a peripheral processing card or module) intercouple via a local bus 336 and couple to a peripheral bus 338 (which may be a back plane) via an interface 316. Peripheral cards couple to the peripheral bus 338. The peripheral cards include a network infrastructure interface card 320, which couples the base station 300 to an access services network ("ASN") gateway 162.

Digital processing cards 322, 324, and 326 couple to the radio frequency (RF) units 328, 330, and 332, respectively. Each of these digital processing cards 322, 324, and 326 performs digital processing for a respective sectors (for example, sector one, sector two, or sector three) serviced by the base station 300 under the mobile wireless and/or fixed wireless access specifications. For example, the digital processing card 322 supports mobile wireless access under the IEEE §802.16e specification, and the digital processing cards 324 through 326 support fixed wireless access under the 802.16d specifications. Thus, each of the digital processing cards 322, 324, and 326 will perform some or all of the processing operations described with reference to FIGS. 5 through 7.

The RF units 328, 330, and 332 couple to antennas 340, 342, and 344, respectively, and support wireless communication between the base station 300 and the mobile terminals. The base station 300 may include other cards 318 as well.

Structures and operational instructions regarding the protocol stack 314 are stored in storage 312. The protocol stack 314 is downloaded to the processor 302 and/or the DRAM 306 as the protocol stack 304 for execution by the processor 302. While the protocol stack is shown to reside within storage 312 within the base station 300, the protocol stack may also be loaded onto portable media such as magnetic media, optical media, or electronic media. Further, the protocol stack 314 structure and/or operational instructions may be electronically transmitted from one computer to another across a data communication path.

Upon execution of the operational instructions and structures regarding the protocol stack 304, the base station 300 performs operations according to the methods and processes described herein with reference to FIGS. 1 through 7. The protocol stack 304 structure and/or operational instructions may be partially executed by the digital processing cards 322, 324, and 326 and/or other components of the base station 300. Further, the structure of the base station 300 illustrated is only one of may varied base station structures that could be operated according to the descriptions contained herein.

Figure 5:
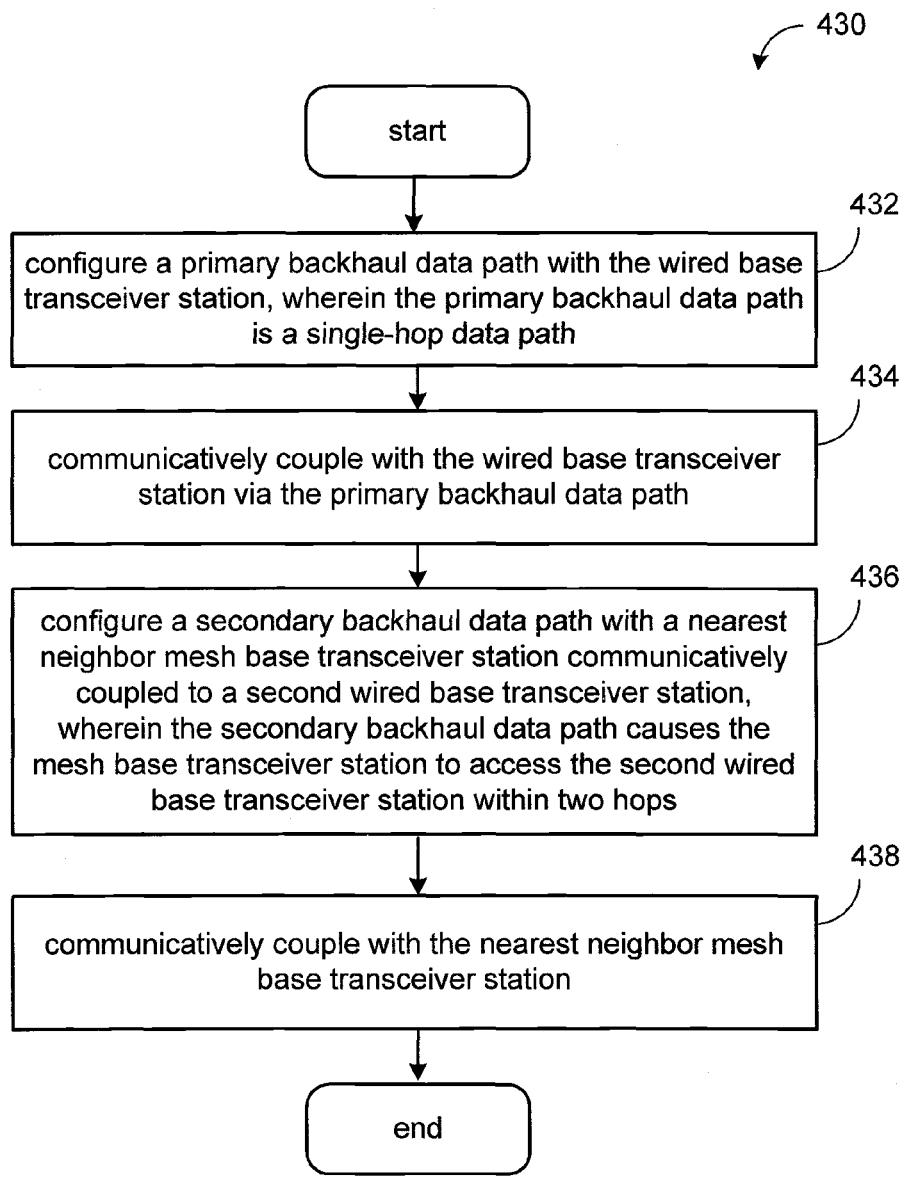
FIG. 5 illustrates a method for creating an optimized backhaul network including a plurality of mesh base transceiver stations and a wired base transceiver station according to an embodiment of the invention.

FIG. 5 illustrates a method 430 for creating an optimized backhaul network including a plurality of mesh base transceiver stations and a wired base transceiver station. The method 430 may be used to configure optimized data paths for each mesh base transceiver station for a topology zone, including primary and secondary data paths. Beginning at step 432, a mesh base transceiver station configures a primary backhaul data path with a wired base transceiver station, wherein the primary backhaul data path is a single-hop data path.

The mesh base transceiver station communicatively couples with the wired base transceiver station via the primary backhaul data path at step 434. At step 436, the mesh base transceiver station configures a secondary backhaul data path with a nearest neighbor mesh base transceiver station. The nearest neighbor to a given mesh base transceiver station is one that belongs to another star topology zone anchored by another wired base transceiver station.

The nearest neighbor may be assessed through network protocols, such as OSPF (Open Shortest Path First) that incorporates least-cost, equal-cost, and load balancing algorithms, or through programmed geographical locations so that a mesh base transceiver station may determine the nearest neighbor mesh base transceiver station, through the operations, administration and maintenance ("OA&M") network functions, et cetera.

At step 438, the nearest neighbor mesh base transceiver station is communicatively coupled to a second wired base transceiver station through the nearest neighbor mesh base transceiver station. The secondary backhaul data path allows the mesh base transceiver station to access the second wired base transceiver station within two hops.

Figure 6:
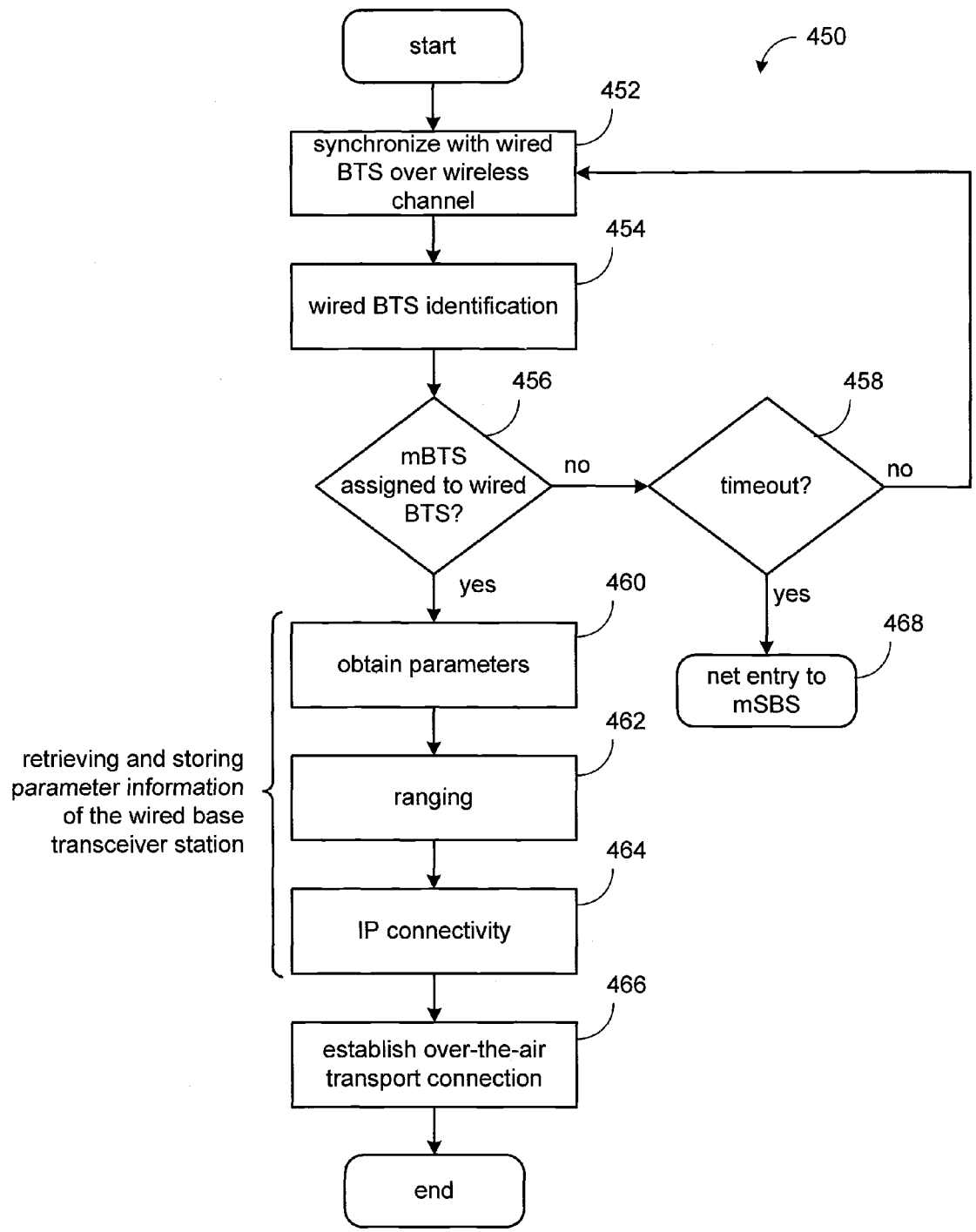
FIG. 6 is a logic diagram illustrating a method for establishing a primary data path for a mesh base transceiver station according to an embodiment of the invention.

FIG. 6 is a logic diagram illustrating a method 450 for establishing a primary data path for a mesh base transceiver station. Beginning at step 452, the mesh base transceiver station synchronizes with the wired base transceiver station over a wireless channel (generally via a downlink channel). At step 454, the wired base transceiver station identification is retrieved. The identification may be retrieved by identifying the preamble symbol and obtaining the wired base transceiver station identification from a DCD (Downlink Channel Descriptor) message.

At step 456 a determination is made whether the mesh base transceiver station is assigned to the wired base transceiver station. Such a determination may be made with respect to the retrieved wired base transceiver station identification with a pre-provisioned star zone mesh base transceiver station identification.

When the mesh base transceiver station is assigned to the wired base transceiver station, then at step 460 the parameters are retrieved and stored from the uplink channel descriptor (UCD) message, and then engage in ranging at step 462 to acquire timing offset and power adjustment values. At step 464, IP connectivity is established. Then at step 466, an over-the-air transport connection with the wired base transceiver station is established based upon the parameter information of the wired base transceiver station. In this step, a pair of uplink and downlink connections is established with a pre-configured bandwidth sufficient to carry the access traffic from the mesh base transceiver station.

When the mesh base transceiver station is not assigned to the wired base transceiver station, then at step 458, the mesh base transceiver station scans for its wired base transceiver station, and continues doing so while a timeout condition at step 458 has not occurred. When a timeout condition occurs, then at step 468, the mesh base transceiver station searches a neighboring star zone topology for mesh net entry.

Figure 7:
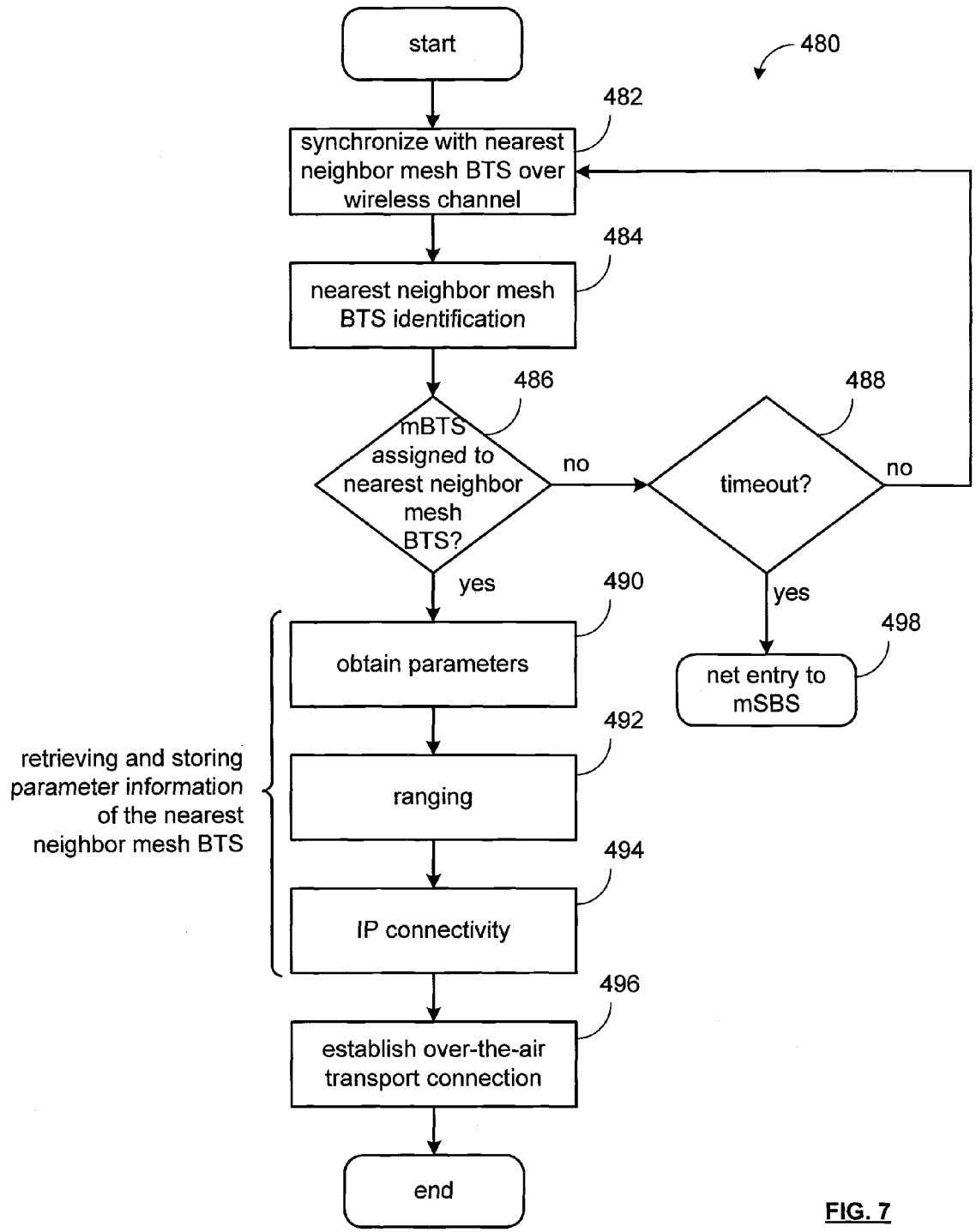
FIG. 7 is a logic diagram illustrating a method for establishing a secondary data path for a mesh base transceiver station according to an embodiment of the invention.

FIG. 7 is a logic diagram illustrating a method 480 for establishing a secondary data path for a mesh base transceiver station. Beginning at step 482, the mesh base transceiver station synchronizes with the nearest neighbor mesh base transceiver station over a wireless channel (generally via a downlink channel). At step 484, the nearest neighbor wired base transceiver station identification is retrieved. The identification may be retrieved by identifying the preamble symbol and obtaining the nearest neighbor base transceiver station identification from a DCD (Downlink Channel Descriptor) message.

At step 486 a determination is made whether the mesh base transceiver station is assigned to the nearest neighbor mesh base transceiver station. Such a determination may be made with respect to the retrieved nearest neighbor base transceiver station identification with a pre-provisioned star zone mesh base transceiver station identification for the given mesh base transceiver station.

When the given mesh base transceiver station is assigned to the wired base transceiver station, then at step 490 the parameters are retrieved and stored from the uplink channel descriptor (UCD) message relating to the nearest neighbor mesh base transceiver station. The mesh base transceiver station then engages in ranging at step 492 to acquire timing offset and power adjustment values. At step 494, Internet Protocol (IP) connectivity is established. Then at step 496, an over-the-air transport connection with the nearest neighbor mesh base transceiver station is established based upon the parameter information for the nearest neighbor mesh base transceiver station. In this step, a pair of uplink and downlink connections is established with a pre-configured bandwidth sufficient to carry the access traffic from the mesh base transceiver station.

When the mesh base transceiver station is not assigned to the nearest neighbor mesh base transceiver station, then at step 488, the mesh base transceiver station continues to scan for its nearest neighbor mesh base transceiver station, and continues doing so while a timeout condition at step 488 has not occurred. When a timeout condition occurs, then at step 498 the mesh base transceiver station proceeds to net entry to scan for the nearest neighbor mesh base transceiver station in an adjacent star zone topology.

The embodiments of the invention disclosed herein are susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method for optimizing backhaul in a network including a plurality of wireless mesh base transceiver stations, the method comprising:
    for each wireless mesh base transceiver station,
        configuring a primary backhaul data path with a wired base transceiver station that includes a backhaul connection for accessing a data network, wherein the primary backhaul data path is a single-hop data path; and
        communicatively coupling with the wired base transceiver station via the primary backhaul data path; and
    wherein the plurality of wireless mesh base transceiver stations form a star topology zone based upon the primary backhaul data path of each of the plurality of mesh base transceiver stations with the wired base transceiver station; and
    for at least one wireless mesh base transceiver station of the plurality of wireless mesh base transceiver stations:
        configuring a secondary backhaul data path with a nearest neighbor wireless mesh base transceiver station communicatively coupled to a second wired base transceiver station outside the star topology zone, wherein the secondary backhaul data path causes the at least one wireless mesh base transceiver station to access the second wired base transceiver station within two hops, wherein configuring the secondary backhaul data path comprises:
            synchronizing the at least one wireless mesh base transceiver station with the nearest neighbor wireless mesh base transceiver station via a wireless channel;
            determining whether the at least one wireless mesh base transceiver station is assigned to the nearest neighbor wireless mesh base transceiver station; and
            when the at least one wireless mesh base transceiver station is assigned to the nearest neighbor wireless mesh base transceiver station, retrieving and storing parameter information of the nearest neighbor wireless mesh base transceiver station; and
        communicatively coupling with the nearest neighbor wireless mesh base transceiver station.

2. The method of claim 1 wherein configuring the primary backhaul data path comprises:
    synchronizing with the wired base transceiver station over a wireless channel;
    determining whether the wireless mesh base transceiver station is assigned to the wired base transceiver station; and
    when the wireless mesh base transceiver station is assigned to the wired base transceiver station, retrieving and storing parameter information of the wired base transceiver station.

3. The method of claim 2 wherein communicatively coupling with the wired base transceiver station comprises:
    establishing, via the wireless channel, an over-the-air transport connection with the wired base transceiver station based upon the parameter information of the wired base transceiver station.

4. The method of claim 1 wherein communicatively coupling with the nearest neighbor wireless mesh base transceiver station comprises:
    establishing, via the wireless channel, an over-the-air transport connection with the nearest neighbor wireless mesh base transceiver station.

5. A method for an optimized backhaul network for a wireless mesh network having a plurality of wireless mesh base transceiver stations, the method comprising:
    for each wireless mesh base transceiver station,
        configuring a primary backhaul data path with a wired base transceiver station that includes a backhaul connection for accessing a data network, wherein the primary backhaul data path is a single-hop data path; and
        communicatively coupling the mesh base transceiver station of the plurality of mesh base transceiver stations with the wired base transceiver station via the primary backhaul data path;
    for at least one wireless mesh base transceiver station of the plurality of wireless mesh base transceiver stations:
        configuring a secondary backhaul data path with a nearest neighbor mesh base transceiver station communicatively coupled to a second wired base transceiver station, wherein the secondary backhaul data path causes the at least one mesh base transceiver station to access the second wired base transceiver station within two hops, wherein configuring the secondary backhaul data path comprises:
            synchronizing, via a wireless channel, the at least one mesh base transceiver station with the nearest neighbor mesh base transceiver station;
            determining whether the at least one mesh base transceiver station is assigned to the nearest neighbor mesh base transceiver station; and when the at least one mesh base transceiver station is assigned to the nearest neighbor mesh base transceiver station, retrieving and storing parameter information of the nearest neighbor mesh base transceiver station; and communicatively coupling the at least one mesh base transceiver station with the nearest neighbor mesh base transceiver station; and wherein the plurality of wireless mesh base transceiver stations form a star topology zone based upon the primary backhaul data path of each of the plurality of mesh base transceiver stations with the wired base transceiver station, and the secondary backhaul data path extends outside the star topology zone.

6. The method of claim 5 wherein configuring the primary backhaul data path comprises:

synchronizing, via a wireless channel, the mesh base transceiver station of the plurality of mesh base transceiver station with the wired base transceiver station;

determining whether the mesh base transceiver station is assigned to the wired base transceiver station; and when the mesh base transceiver station is assigned to the wired base transceiver station, retrieving and storing parameter information of the wired base transceiver station.

7. The method of claim 5 wherein communicatively coupling with the wired base transceiver station comprises:

establishing, over the wireless channel, an over-the-air transport connection with the wired base transceiver station.

8. The method of claim 5 wherein communicatively coupling with the nearest neighbor mesh base transceiver station comprises:

establishing, via the wireless channel, an air transport connection with the nearest neighbor mesh base transceiver station.

9. The method of claim 5 wherein at least one of the mesh base transceiver stations of the plurality of mesh base transceiver stations comprises at least one of:

a multiple-input, multiple-output (MIMO) base transceiver station, a single-input, multiple-output (SIMO) base transceiver station, a single-input, single-output (SISO) base transceiver station, or a multiple-input, single-output base (MISO) transceiver station.

10. A wireless mesh base transceiver station to provide an optimized backhaul network access to at least one subscriber station, the wireless mesh base transceiver station comprising:

processing circuitry;

a subscriber station network interface operably coupled to the processing circuitry that supports wireless data transmission with the at least one subscriber station;

a wired base transceiver station interface operably coupled to the processing circuitry that supports wireless data transmission with the wired base transceiver station;

memory operably coupled to the processing circuitry, wherein the memory stores operational instructions that cause the processing circuitry to:

configure a primary backhaul data path with the wired base transceiver station, wherein the primary backhaul data path is a single-hop data path; and communicatively coupling the wireless mesh base transceiver station with the wired base transceiver station via the primary backhaul data path;

configure, via a wireless channel, a secondary backhaul data path with a nearest neighbor wireless mesh base transceiver station communicatively coupled to a second wired base transceiver station outside the star topology zone, wherein the secondary backhaul data path causes the wireless mesh base transceiver station to access the second wired base transceiver station within no more than two hops, wherein configuring the secondary backhaul data path comprises:

synchronizing, via the wireless channel, the wireless mesh base transceiver station with the nearest neighbor wireless mesh base transceiver station;

determining whether the wireless mesh base transceiver station is assigned to the nearest neighbor wireless mesh base transceiver station; and when the wireless mesh base transceiver station is assigned to the nearest neighbor wireless mesh base transceiver station, retrieving and storing parameter information of the nearest neighbor wireless mesh base transceiver station; and communicatively couple the wireless mesh base transceiver station with the nearest neighbor wireless mesh base transceiver station;

wherein the plurality of wireless mesh base transceiver stations form a star topology zone based upon the primary backhaul data path of each of the plurality of mesh base transceiver stations with the wired base transceiver station.

11. The wireless mesh base transceiver station of claim 10 wherein the memory further stores operational instructions that cause the processing circuitry to configure the primary backhaul data path by:

synchronizing, over a wireless channel, the wireless mesh base transceiver station with the wired base transceiver station;

determining whether the wireless mesh base transceiver station is assigned to the wired base transceiver station; and when the wireless mesh base transceiver station is assigned to the wired base transceiver station, retrieving and storing parameter information of the wired base transceiver station.

12. The wireless mesh base transceiver station of claim 11 wherein the memory further stores operation instructions to communicatively coupling with the wired base transceiver station by:

establishing, via the wireless channel, an over-the-air transport connection with the wired base transceiver station.

13. The wireless mesh base transceiver station of claim 10 wherein communicatively coupling with the wired base transceiver station comprises:

establishing, via the wireless channel, an over-the-air transport connection with the nearest neighbor wireless mesh base transceiver station.

14. The wireless mesh base transceiver station of claim 10 wherein the wireless mesh base transceiver station comprises at least one of:

a multiple-input, multiple-output (MIMO) base transceiver station, a single-input, multiple-output (SIMO) base transceiver station, a single-input, single-output (SISO) base transceiver station, or a multiple-input, single-output (SIMO) base transceiver station.

* * * * *